United States Patent [19]
Han

[11] Patent Number: 5,369,534
[45] Date of Patent: Nov. 29, 1994

[54] RECORDING AND REPRODUCING APPARATUS INCLUDING RECORDING/REPRODUCING HEAD SWITCHABLY CONNECTED TO COMMON ROTARY TRANSFORMER

[75] Inventor: Hyeong-deog Han, Suwon, Rep. of Korea

[73] Assignee: Samsung Electronics Co., Ltd., Kyunggi, Rep. of Korea

[21] Appl. No.: 144,320

[22] Filed: Nov. 1, 1993

[30] Foreign Application Priority Data
Oct. 31, 1992 [KR] Rep. of Korea .................... 92 21418

[51] Int. Cl.$^5$ ......................... G11B 15/44; G11B 5/09
[52] U.S. Cl. ....................................... 360/64; 360/40
[58] Field of Search ...................... 360/64, 61, 46, 63, 360/58, 51, 30, 107, 19.1, 66

[56] References Cited

U.S. PATENT DOCUMENTS

| | | | |
|---|---|---|---|
| 4,605,974 | 8/1986 | Ochi et al. | 360/64 X |
| 4,639,805 | 1/1987 | Hirota et al. | 360/108 |
| 4,926,273 | 5/1990 | Tabuchi et al. | 360/64 |
| 5,019,926 | 5/1991 | Van Thuijl et al. | 360/84 |
| 5,057,944 | 10/1991 | Ozaki et al. | 360/64 X |
| 5,111,346 | 5/1992 | Matsuoka | 360/64 |
| 5,121,265 | 6/1992 | Hirose et al. | 360/64 |
| 5,126,892 | 6/1992 | Nagasawa et al. | 360/64 |
| 5,245,482 | 9/1993 | Sagawa et al. | 360/64 X |
| 5,282,096 | 1/1994 | Morisaki et al. | 360/64 |

FOREIGN PATENT DOCUMENTS 58-45604 3/1983 Japan .................. G11B 5/02

Primary Examiner—Donald Hajec
Assistant Examiner—Le Thien Minh
Attorney, Agent, or Firm—Sughrue, Mion, Zinn, Macpeak & Seas

[57] ABSTRACT

A recording and reproducing apparatus includes a rotatable rotating assembly and a fixed assembly disposed opposite thereto. The apparatus also includes a plurality of recording and reproducing heads and an erasing head mounted on the rotating assembly and first and second rotary transformers, having primary windings mounted on the rotating assembly and secondary windings mounted on the fixed assembly. A control signal generator is mounted on the rotating assembly and receives signals via the primary winding of the second rotary transformer. A first signal processor is mounted on the rotating assembly and connects the plural recording and reproducing heads to the primary winding of the first rotary transformer and a switch connects the erasing head with primary winding of the second rotary transformer. A recording and reproducing processor is connected the secondary winding of the first rotary transformer while a modulation signal generator is connected to the second winding of the second rotary transformer. A power supply is mounted on the rotating assembly is connected to the primary winding of the second rotary transformer. The apparatus enables M transformers to power N heads, where M and N are integers and M is less than N, thereby enabling the use of plural heads through one rotary transformer.

15 Claims, 5 Drawing Sheets

FIG. 3
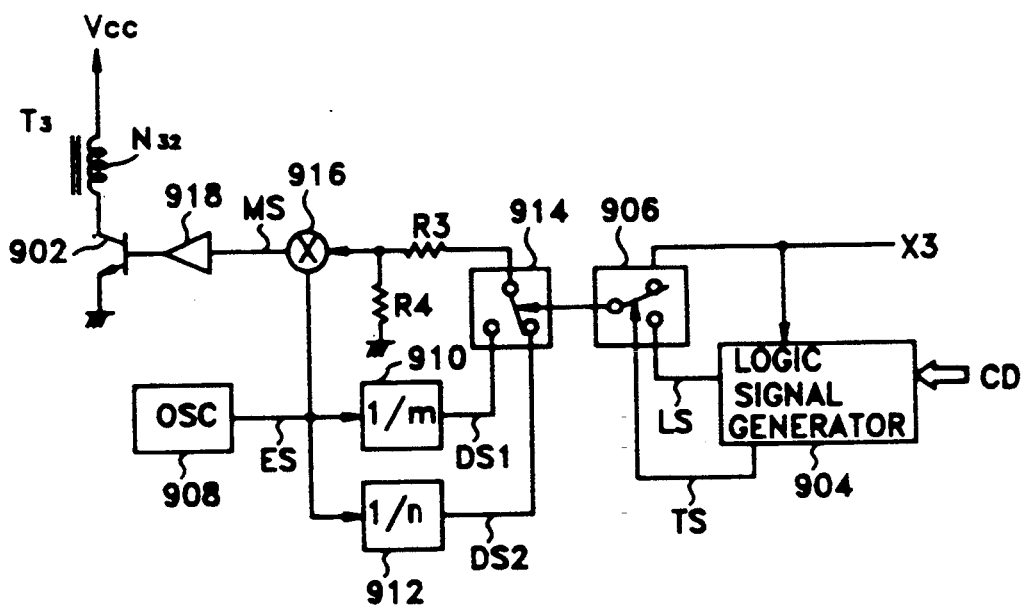
FIG. 4A X3
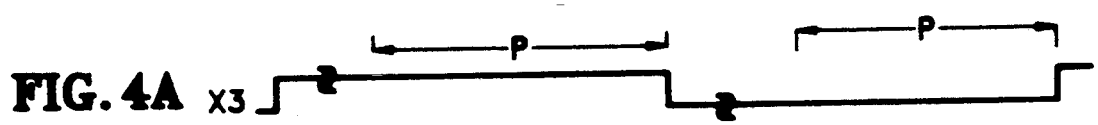
FIG. 4B TS
FIG. 4C LS
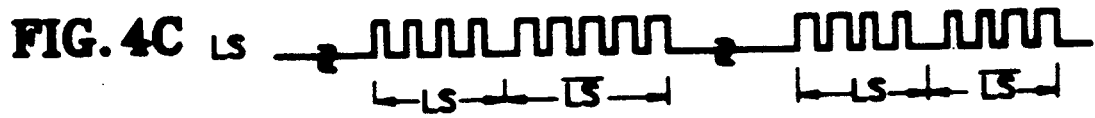
FIG. 4D MS

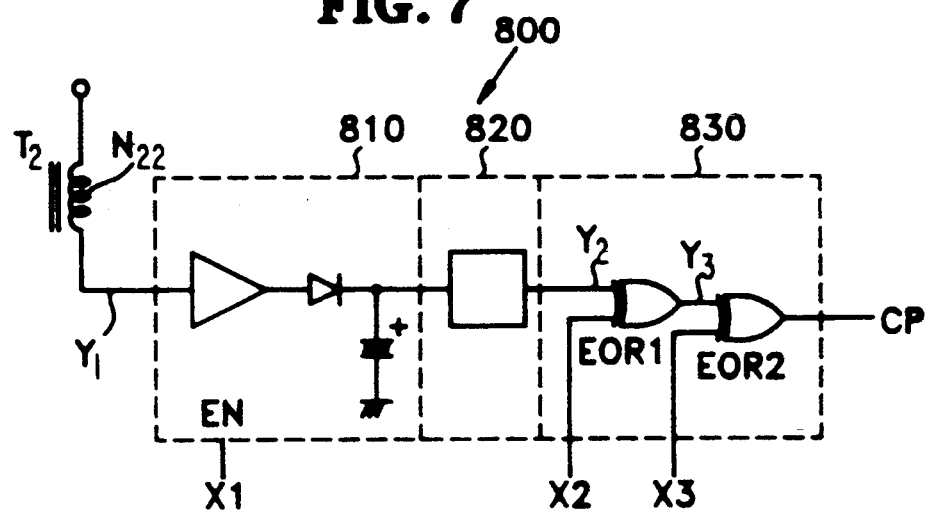
FIG. 7
FIG. 8A X1
FIG. 8B X2
FIG. 8C X3
FIG. 8D Y1
FIG. 8E Y2
FIG. 8F Y3
FIG. 8G LP

RECORDING AND REPRODUCING APPARATUS INCLUDING RECORDING/REPRODUCING HEAD SWITCHABLY CONNECTED TO COMMON ROTARY TRANSFORMER

FIELD OF THE INVENTION

The present invention relates to a recording and reproducing apparatus, and more particularly, to the improvement in signal transmission between the rotating and fixed assemblies of the head drum for a multi-rotary head type magnetic recording and reproducing apparatus.

Korean Utility Model Application No. 92-21418 is incorporated herein by reference for all purposes.

BACKGROUND OF THE INVENTION

A general magnetic recording and/or reproducing apparatus such as a video tape recorder (VTR) records and reproduces information by way of a magnetic tape being scanned obliquely by a rotary head for high density recording. Thus, in a conventional VTR, as shown in FIG. 1, rotary heads H1, H2, . . . Hn and primary windings N11, N21, . . . Nn1 of rotary transformers T1, T2, . . . Tn are mounted on an upper rotary cylinder A of head drum while secondary windings N12, N22, . . . Nn2 of rotary transformers T1-Tn are mounted on a downside stationary cylinder B. The rotary heads are electrically connected through the rotary transformers to a head switching and preamplifier circuit C. Accordingly, equal numbers of rotary transformers and rotary heads are placed in a concentric circular pattern on a plane for a tight coupling between the primary and secondary windings of the rotary transformers. Here, the primary windings of each rotary transformer are placed in a concentric circular pattern in the lower part of the upper cylinder and the secondary windings of each rotary transformer are placed in a concentric circular pattern in the upper part of the lower cylinder.

Table 1 shows the number of heads used in various models of rotary head type VTRs. It will be noted that the number of heads increases for multifunction and high-quality VTRs, which restricts installation space for rotary transformers having a planar configuration.

TABLE 1

| Model type | Head | Video head | Audio head | Erasing head |
|---|---|---|---|---|
| 2-head | 2 | 2 | — | — |
| 4-head | 4 | 4 | — | — |
| 4-head hi-fi | 6 | 4 | 2 | — |
| 4-head advanced A | 7 | 4 | 2 | 1 |
| 4-head advanced B | 9 | 6 | 2 | 1 |

Since the intervals between windings decreases when the number of heads increases, a degradation of signal-to-noise (S/N) ratio is caused by cross-talk between the transformers. Therefore, the circuit design for signal processing is more complex and more expensive.

To address this problem, vertically mounted tiers of rotary transformers are disclosed in U.S. Pat. Nos. 4,639,805 and 5,019,926. An alternative approach using optical transmission means instead of a rotary transformer is disclosed in Japan Patent Sho 58-45604.

On the other hand, U.S. Pat. No. 4,926,273 discloses transmission of an information signal, an operational power signal and a control signal through rotary transformer using a time sharing system. An amplifier and a head switching circuit are installed in the upper cylinder of the head drum for a tight coupling between head and amplifier. However, since the power signal is not supplied during the signal transmission period in the disclosed time sharing system, a bulky charging circuit and a power stabilizing circuit are necessary in order to supply enough power to the circuitry in the upper rotary cylinder. Therefore, the circuit configuration becomes complex.

The present invention was motivated by a desire to overcome the problems in the prior art.

SUMMARY OF THE INVENTION

In order to solve the aforementioned problems of the prior art, it is one object of the present invention to provide a recording and reproducing apparatus which can reduce the number of rotary transformers by providing one rotary transformer which is shared by a plurality of heads.

Another object of the present invention is to provide a recording and reproducing apparatus which can simplify the power supply in a rotating assembly by transmitting the modulated control signals continuously after modulating the erasing and power signals.

To accomplish the above objects, an apparatus for recording and reproducing information signals to and from magnetic tape, according to the present invention comprises:

a rotating assembly;

a fixed assembly;

a plurality of recording and reproducing heads mounted on the rotating assembly for recording and reproducing information signal with respect to magnetic tape;

an erasing head mounted on said rotating assembly for erasing the information signal recorded to the magnetic tape;

first and second rotary transformers whose primary windings are mounted on the rotating assembly and whose secondary windings are mounted on the fixed assembly;

a control signal generator mounted on the rotating assembly and connected to the primary winding of the second rotary transformer for generating switching control signals;

a first signal processor mounted on the rotating assembly and connected between the plural recording and reproducing heads and the primary winding of the first rotary transformer for processing an information signal in response to the switching control signals;

a switch connected between the erasing head and primary winding of the second rotary transformer, the switch being controlled in response to the switching control signals;

a recording and reproducing processor connected to the secondary winding of the first rotary transformer for processing the information signal;

a modulation signal generator connected to the secondary winding of the second rotary transformer for modulating an erasing signal and a control signal and supplying the modulated signal, to the secondary winding of the second rotary transformer; and a power supply mounted on the rotating assembly and connected to the primary winding of the second rotary transformer supplying operating power voltage to the respective circuit means of the rotating assembly.

In the present invention, the switch is provided in the rotating assembly so that a plurality of recording and reproducing heads are connected to the fixed circuit assembly through a rotary transformer. Power and switching control signals are supplied from the fixed circuit assembly to the rotating assembly through another rotary transformer. Therefore, since fewer rotary transformers than recording and reproducing heads are installed, many more heads can be easily mounted on the rotating assembly. Since power can be supplied continuously using the erasing rotary transformer (not the recording and reproducing rotary transformer), the design of a power supply circuit to be installed in the rotating assembly is advantageously simplified.

These and other objects, features and advantages of the invention are disclosed in or apparent from the following description of preferred embodiments.

BRIEF DESCRIPTION OF THE DRAWINGS

The above objects and other advantages of the present invention will become more apparent by describing in detail a preferred embodiment thereof with reference to the attached drawings, in which:

FIG. 3 is a detailed circuit diagram of the modulation signal generator shown in FIG. 2;

FIGS. 4A to 4D are waveform diagrams which are useful in illustrating the operation of the circuitry shown in FIG. 3;

FIG. 7 is an exemplary detailed circuit diagram of a color phase control signal generator; and FIGS. 8A to 8G waveforms which are useful in illustrating the operation of various sections of the circuitry shown in FIG. 7.

DETAILED DESCRIPTION OF THE INVENTION

A preferred embodiment of the present invention will be described in detail hereinbelow with reference to the accompanying drawings.

Figure 1:
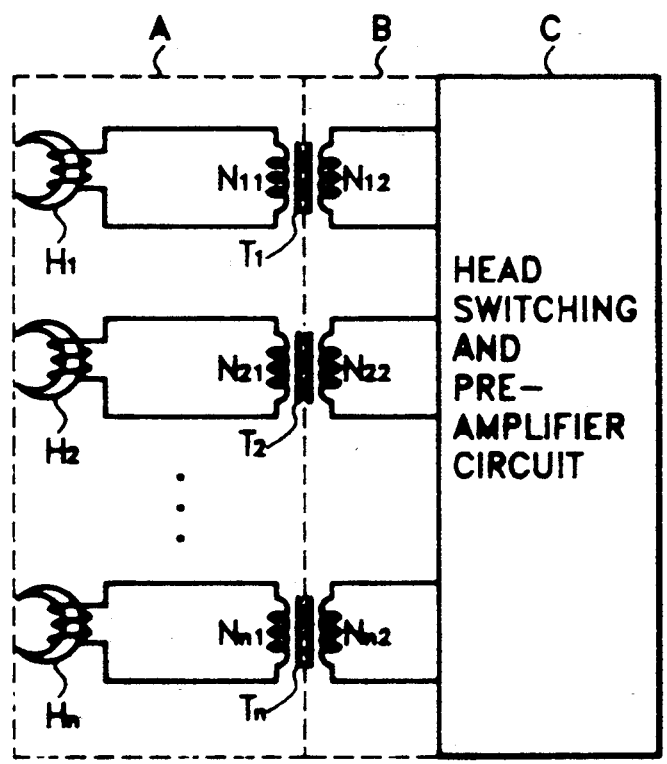
FIG. 1 is a diagram showing the relationship between head and rotary transformers in a conventional VTR.
Figure 2:
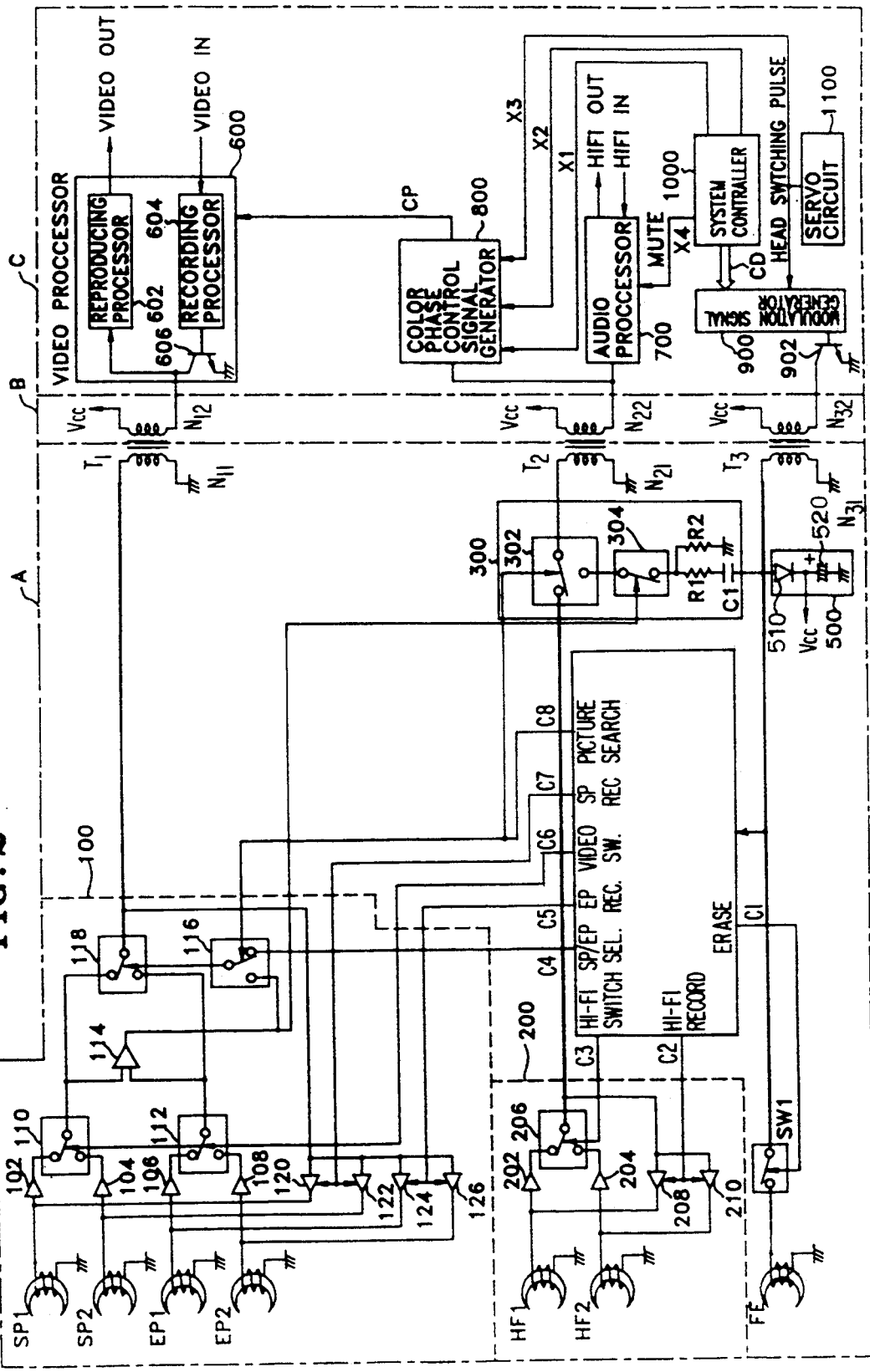
FIG. 2 is a block diagram showing the configuration of a 7-head type VTR according to the present invention.

In FIG. 2, which is a block diagram of a 7-head type VTR according to the present invention, the reference letter A represents a rotating assembly of a circuit installed in the upper rotary cylinder of the head drum while B represents a fixed assembly of a circuit of the lower stationary cylinder. C represents a circuit assembly. Rotating assembly advantageously includes a pair of standard recording and reproducing heads SP1 and SP2, a pair of long-play recording and reproducing heads EP1 and EP2, a pair of hi-fi recording and reproducing heads HF1 and HF2 and an erasing head FE. Preferably rotating assembly A further includes primary windings N11, N21 and N31 of first, second and third rotary transformers T1, T2 and T3. The standard and long-play recording and reproducing heads SP1, SP2, EP1 and EP2 are connected to primary winding N11 through a first signal processing circuit 100. The hi-fi recording and reproducing heads HF1 and HF2 are connected to primary winding N21 through second and third signal processing circuits 200 and 300. The erasing head FE is connected to primary winding N31 through a first switch SW1. Control signal generating circuit 400, which is connected to the first winding N31 generates control signals C1 to C8 by detecting a logic signal modulated on an erasing signal and decoding the detected logic signal. Control signals C1 to C8 include: an erasing control signal C1, a hi-fi recording control signal C2, a hi-fi head switching pulse signal C3, a standard and long-play select control signal C4, a long-play recording control signal C5, a head switching pulse signal C6, a standard recording control signal C7, and a picture search control signal C8. Power supply circuit 500 advantageously includes a rectifier 510 and a capacitor 520 connected to primary winding N31 and supplies an operating power voltage to these circuits by rectifying the erasing signal and then smoothing the rectified signal.

First signal processing circuit 100 advantageously includes reproducing amplifiers 102, 104, 106 and 108 for amplifying the reproducing video information signal picked up from heads SP1, SP2, EP1 and EP2, respectively, a first head switch 110 for switching between a pair of standard recording and reproducing heads SP1 and SP2 in response to head switching pulse signal C6, a second head switch 112 for switching between a pair of long-play recording and reproducing heads EP1 and EP2 in response to head switching pulse signal C6, a comparator 114 for comparing the outputs of first and second head switches 110 and 112, a signal select switch 116 for selecting between the output signal of the comparator 114 and the standard/long-play select control signal C4 in response to picture search control signal C8.

Preferably, circuit 100 also includes a head select switch 118 for selecting between the first and second head switches 110 and 112 in response to the output signals of the signal select switch 116 for connecting the selected heads to the primary winding of first rotary transformer T1. In an exemplary case, circuit 100 includes a pair of first recording amplifiers 120 and 122 for amplifying the recording signal from the primary winding N11 in response to standard recording control signal C7 and supplying the amplified signals to standard recording and reproducing heads SP1 and SP2, and a pair of second recording amplifiers 124 and 126 for amplifying the recording signal from primary winding N11 in response to a long-play recording control signal C5 and supplying the amplified signals to long-play recording and reproducing heads EP1 and EP2.

The second signal processing circuit 200 preferably includes reproducing amplifiers 202 and 204 for amplifying the reproducing signal picked up from hi-fi heads HF1 and HF2, a third head switch 206 for switching between hi-fi heads HF1 and HF2 in response to a hi-fi head switching pulse signal C3, and recording amplifiers 208 and 210 for amplifying the hi-fi recording signal and supplying the amplified signals to hi-fi heads HF1 and HF2 in response to the hi-fi recording control signal C2.

The third signal processing circuit 300 advantageously includes a signal select switch 302 for selecting between the output signal from second signal processing circuit 200 and an erasing signal from primary winding N31 and supplying the selected signal to primary winding N21 in response to picture search control signal C8, and a second switch 304, which is connected between primary winding N31 and the erasing signal input terminal of signal select switch 302 and which is switched in response to the output of comparator 114. In signal processor 200, R1 and R2 represent resistances and C1 represents a capacitor.

Secondary windings N12, N22 and N32 of the first, second and third rotary transformers T1, T2 and T3 are mounted on the lower stationary cylinder of the head drum in correspondence with primary windings N11, N21 and N31 mounted on the upper rotary cylinder.

Circuit assembly C includes a video processor 600, an audio processor 700, a color phase control signal generator 800, a modulation signal generator 900, a system controller 1000 and a servo circuit 1100.

Video processor 600 is connected to secondary winding N12 of first rotary transformer T1. When a reproducing video signal is processed, a video signal is generated in a reproducing processor 602. When a video signal is input, a recording video signal is generated in a recording processor 604 and supplied to secondary winding N12 of first rotary transformer T1 through a first switching circuit 606. During screen detecting reproduction, video processor 600 receives a color phase control signal CP and controls the phase of the reproduced color signal.

Color phase control signal generator 800 receives a screen detecting control signal X1, a standard/long-play select control signal X2 and a head switching pulse signal X3. Color phase control signal generator 800 also receives a signal from secondary winding N22 of second rotary transformer T2 at the time of screen detection, and generates color phase control signal CP supplied to video processor 600. Audio processor 700 receives an input hi-fi audio signal, supplies the received signal to secondary winding N22 of second rotary transformer T2, processes the reproducing hi-fi audio signal from secondary winding N22 and outputs the hi-fi audio signal.

Preferably, servo circuit 1100 controls the rotation of a head drum and the transmission speed and phase of a magnetic tape and generates head switching pulse signal X3. System controller 1000 generates screen detecting control signal X1, standard/long-play select control signal X2 and a mute control signal X4, enables the color phase control signal generator 800 during the screen detecting mode of operation, supplies mute control signal X4 to audio processor 700 and generates a system control data signal CD consisting of control signals for standard/long-play selection, standard recording, long-play recording, hi-fi recording, erasing and screen detection. Modulation signal generator 900 receives head switching pulse signal X3 and system control data signal CD and supplies a modulation signal, which is generated by modulating the erasing signal, to the secondary winding N32 of third rotary transformer T3 through a second switching circuit 902.

FIG. 3 illustrates an exemplary form of the modulation signal generator 900 shown in FIG. 2. Preferably, modulation signal generator 900 includes a logic signal generator 904 generating logic signals LS and $\overline{LS}$ in response to control data signal CD supplied from system control circuit 1000, a first select switch 906 for selecting head switching pulse signal X3 supplied from servo circuit 1100 or the logic signal LS in response to a logic timing signal TS generated by logical signal generator 904, an oscillator 908 for generating an erasing signal of a predetermined frequency, a first frequency divider 910 generating a first frequency-divided signal DS1, which is a signal frequency-dividing the erasing signal ES by a first predetermined frequency 1/m, a second frequency divider 912 for generating a second frequency-divided signal DS2, which is a signal frequency-dividing the erasing signal ES by a second predetermined frequency 1/n, a second select switch 914 for selecting the first or second frequency signals DS1 and DS2 in response to the output signal of the first select switch 906, a mixer 916 for mixing the erasing signal ES and the output signal of the second select switch 914, and a current amplifier 918 for current-amplifying and supplying the output signal of the mixer 916 as a modulation signal to secondary winding N32 of the third rotary transformer T3 via second switching circuit 902. Here, R3 and R4 represent resistances.

Figure 5:
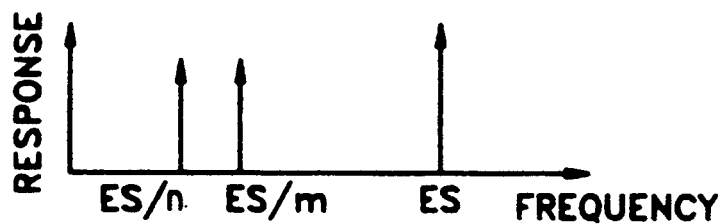
FIG. 5 is a graph showing the frequency characteristics of a modulation signal according to the present invention.

Referring to FIGS. 4A to 4D, a predetermined period P of head switching pulse signal X3 is gated by logic timing signal TS, logic signals LS and $\overline{LS}$ formed in response to a control signal is modulated during the period P of the gated head switching pulse signal and first and second frequency-divided signals DS1 and DS2 are switched to head switching pulse which is modulated with logic signal LS and $\overline{LS}$, thereby selecting first frequency-divided signal DS1 in a high period and second frequency-divided signal DS2 in a low period. It should be noted that logic signal generator 904 produces both logic signal LS and an inverted for of the logic signal, i.e., logic signal $\overline{LS}$. It will also be appreciated that both forms of logic signal output are output as serial data from logic signal generator 904. Thereafter, a composite frequency signal is sent to mixer 916 and therein loaded onto the erasing signal ES, supplied to current amplifier 918 as a modulated erasing signal MS which is amplified at a predetermined gain and supplied as modulation signal to secondary winding N32 of third rotary transformer T3 through second switching circuit 902. Accordingly, the modulation signal has the frequency characteristics as shown in FIG. 5. It should be noted that current amplifier 918 amplifies the current enough to produce operating voltage Vcc for rotary section A.

Figure 6:
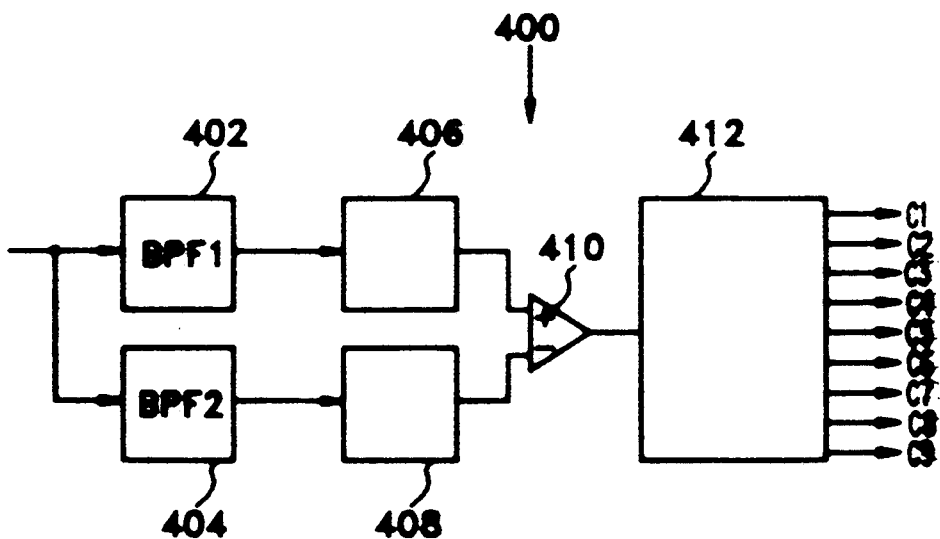
FIG. 6 is an exemplary detailed circuit diagram of the control signal generating circuit shown in FIG. 2.

Referring to FIG. 6, control signal generator 400 according to the present invention includes a first bandpass filter 402 for passing only frequency component ES/m of first frequency-divided signal DS1 from the modulation signal transmitted to primary winding N31 of third rotary transformer T3, a second bandpass filter 404 for passing only frequency component ES/n of second frequency-divided signal DS2 from the modulation signal, a first envelope detector 406 for detecting the envelope of the output signal from first bandpass filter 402, a second envelope detector 408 for detecting the envelope of the output signal from second bandpass filter 404, a comparator 410 for comparing output signals of the first and second envelope detectors 406 and 408, and a decoding circuit 412 for generating a hi-fi head switching pulse signal C3 and head switching pulse signal C6 by receiving the output of comparator 410 and generating erasing control signal C1, hi-fi recording control signal C2, standard/long-time select control signal C4, long-play recording control signal C5, standard recording control signal C7 and screen detecting control signal C8 by decoding the logic signal. Control signal generating circuit 400 detects the components of the first and second frequency-divided signals from the modulation signal and compares the amplitude of the two detected signals, thereby demodulating the head switching signal and logic signal, decoding the demodulated logic signal and generating a control signal.

Color phase control signal generator 800, as shown in FIG. 7, is enabled in a screen detecting mode in response to screen detecting control signal X1 generating color phase control signal CP. Preferably, color phase control signal generator 800 includes an envelope detector 810 for detecting an envelope in response to a signal Y1 transmitted to secondary winding N22 of second rotary transformer T2, a wave shaper 820 for wave-shaping the output signal of envelope detector 810 and a logic synthesis circuit 830 for logically synthesizing wave-shaped signal Y2 in response to head switching pulse signal X3 supplied from servo circuit 1100 and standard/long-play select control signal X2 supplied from system control circuit 1000. The logic synthesis circuit 830 has a first "or else" circuit EOR1 for logically synthesizing the wave-shaped signal Y2 and standard/long-play select control signal X2 and a second "or else" circuit EOR2 for logically synthesizing output of the first "or else" circuit EOR1 and head switching pulse signal X3 and generating color phase control signal CP. In other words, in accordance with the setting of a standard mode or long-play mode, head switching information depending on the head selected by first signal processing circuit 100 is generated as a color phase control signal CP at the time of detecting the screen. Since second long-play recording and reproducing tread SP2 is placed adjacent to first standard recording and reproducing head SP1 and first long-play recording and reproducing head EP1 is placed adjacent to second standard recording and reproducing head SP2, on the head drum, if a head other than for a recording mode is selected, the phase of head switching pulse signal X3 can be inverted.

Next, a description of function and effect of the present invention will be given. The output of oscillator 908 of modulation signal generator 900 is transmitted to power supply circuit 500 of rotating assembly A through third rotary transformer T3. The transmitted AC (alternating current)-oscillated signal is rectified, smoothed and provided as DC (direct current)-operating power voltage Vcc. The operating power voltages necessary for the respective circuits of rotating assembly A are thus supplied. Therefore, according to the present invention, a continuous power supply is possible, thereby diminishing and simplifying the configuration of power supply circuit 500 of rotating assembly A.

Thus, when the standard recording mode is selected in the state that power is supplied, a mode control signal is generated as a standard recording control signal C7 through system controller 1000, modulation signal generator 900, third rotary transformer T3 and control signal generator 400, which enables first recording amplifiers 120 and 122. Similarly, hi-fi recording control signal C2 is also transmitted to enable recording amplifiers 208 and 210 of second signal processor 200. The video signal is supplied to standard recording and reproducing heads SP1 and SP2 through recording processor 604, first switching circuit 606, first rotary transformer T1 and first recording amplifiers 120 and 122. The audio signal is supplied to hi-fi recording and reproducing heads HF1 and HF2 through audio processor 700, second rotary transformer T2, select switch 302 of third signal processor 300 and recording amplifiers 208 and 210 of second signal processor 200.

During standard reproduction, standard/long-play select control signal C4 is transmitted in the same manner to control first head select switch 118 through first select switch 116 and select first head switch 110. The signals picked up from standard recording and reproducing heads SP1 and SP2 are generated as video signals through first reproducing amplifiers 102 and 104, first head switch 110, head select switch 118, first rotary transformer T1 and reproducing processor 602 while the signals picked up from hi-fi heads HF1 and HF2 are generated as audio signals through reproducing amplifiers 202 and 204, head switch 206, select switch 302, second rotary transformer T2 and audio recording and reproducing processor 700. Head switching pulse signals C6 and C3, which switch head switches 110, 112 and 206 during reproduction are transmitted to the head switches 110, 112 and 206 as switching control signals through servo circuit 1100, modulation signal generator 900, third rotary transformer T3 and control signal generator 400.

During long-play recording or reproducing, the long-play mode control signal is transmitted in the same manner to control second recording amplifiers 124 and 126 and head select switch 116. Therefore, when recording and/or reproducing the video signal, since the standard mode and long-play mode both transmit signals between rotating assembly A and fixed assembly B through first rotary transformer T1, the number of rotary transformers can be reduced to less than the number of heads.

During erasing, erasing control signal C1 is transmitted to rotating assembly A through third rotary transformer T3 to turn erasing switch SW1 on, and the erasing signal is thus transmitted to erasing head FE through erasing switch SW1.

During screen detection, picture search control signal C8 is transmitted to rotating assembly A to control signal select switches 116 and 302, which selects the output signal of comparator 114, and is switched to select second switch 304. Also, color phase control signal generator 800 is enabled by screen detecting control signal X1 supplied from system controller 1000. The signals picked up from the two pairs of heads SP1, SP2, EP1 and EP2 are input to comparator 114 through head switches 110 and 112, and the output signal of comparator 114 is supplied as the switching control signal of head select switch 118 through signal select switch 116. At the same time, output signal of comparator 114 is supplied as the switching control signal of second switch 304. Thus, the signals picked up by heads SP1, SP2, EP1 and EP2 are mutually compared. It will be noted that the component signals which are picked up through a head and which have the same azimuth angle as that used in the recording mode will produce a maximum signal. That signal advantageously can be selected via head select switch 118 and supplied to first rotary transformer T1.

Simultaneously, second switch 304 is on/off-controlled by the output signal of comparator 114 in order to transmit an automatic head switching signal to circuit assembly C, thereby supplying the erasing signal to second rotary transformer T2 through signal select switch 302 intermittently. The intermittent erasing signal transmitted through second rotary transformer T2 is input to color phase control signal generator 800 converted to as color phase control signal CP according to head switching signal X3 and standard/long-play select control signal X2. The color phase control signal CP is supplied to reproducing processor 602. Reproducing processor 602 processes the reproduced video signal supplied through first rotary transformer T1 in response to the color phase control signal CP and generates the output video signal.

As described above, in the present invention, a signal processor is installed within the upper cylinder of the head drum. The erasing signal, head switching pulse signal and control signal are modulated and transmitted to the circuitry of the rotating assembly whereby the operating power is obtained by rectifying and smoothing the modulation signal. The head switching pulse signal and control signal are detected from the modulation signal, and plural heads are selectively connected to a rotary transformer for recording and reproducing a signal, thereby utilizing one rotary transformer coupled to plural heads. Therefore, there is no need to increase the number of rotary transformers to increase the number of heads and, thus, only two or three rotary transformers for transmitting the video and erasing signals or the video, the audio and the erasing signals are necessary. Considering the conventional, seven or nine rotary transformers required for 7- or 9-head type VTRs, which transformers are installed on the head drum in a concentric circular pattern, the present invention uses only two or three rotary transformers. Thus, the winding of the rotary transformers can be mounted easily in a concentric circular pattern in one plane. Moreover, since the operating power signal is transmitted continuously through an erasing rotary transformer, it is not necessary to amplify the current greatly. The power supply circuit of the rotating assembly can be simply constructed, in an exemplary case, using a rectifying diode and a smoothing capacitor, which circuit advantageously uses a small amount of space in the upper head.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus for recording and reproducing an information signal to and from magnetic tape, comprising:
    a rotatable rotating assembly;
    a fixed assembly;
    a plurality of recording and reproducing heads mounted on said rotating assembly for recording and reproducing the information signal to and from said magnetic tape;
    an erasing head mounted on said rotating assembly for erasing the information signal recorded to said magnetic tape;
    a first rotary transformer and a second rotary transformer whose respective primary windings are mounted on said rotating assembly and whose respective secondary windings are mounted on said fixed assembly;
    a control signal generator mounted on said rotating assembly and connected to the primary winding of said second rotary transformer for generating switching control signals;
    a first signal processor mounted on said rotating assembly and connected between said recording and reproducing heads and the primary winding of said first rotary transformer for reproducing an information signal in response to said switching control signals;
    a switching circuit connected between said erasing head and said primary winding of said second rotary transformer, said switching circuit being switch-controlled in response to said switching control signals;
    a recording and reproducing processor connected to the secondary winding of said first rotary transformer for processing the information signal;
    a modulation signal generator connected to the secondary winding of said second rotary transformer for modulating an erasing signal responsive to a control signal to produce a modulated signal supplied to the secondary winding of said second rotary transformer; and
    a power supply mounted on said rotating assembly and connected to the primary winding of said second rotary transformer for supplying operating power voltage to said control signal generator.

2. The recording and reproducing apparatus as claimed in claim 1, wherein said first signal processor includes a plurality of amplifiers for amplifying the reproduced information signal.

3. The recording and reproducing apparatus as claimed in claim 1, wherein said modulation signal generator comprises:
    an oscillator for generating a predetermined first frequency signal as an erasing signal;
    a first frequency-divider producing a second frequency signal from said first frequency signal;
    second frequency-divider producing a third frequency signal from said first frequency signal;
    a selector for selecting one of said second frequency signal and said third frequency signal in response to a timing signal; and
    a mixer for modulating said first frequency signal with an output signal from said selector and supplying said modulated signal to the secondary winding of said second rotary transformer.

4. The recording and reproducing apparatus as claimed in claim 1, wherein said control signal generator comprises:
    a first filter and a second filter for filtering respective components of said second frequency signal and said third frequency signal from said modulated signal received from said second rotary transformer;
    a comparator for comparing the detected signals of said first filter and said second filter and demodulating said control signal; and
    decoder for decoding said demodulated control signal and generating said switching control signals.

5. The recording and reproducing apparatus as claimed in claim 1, wherein said power supply comprises:
    a rectifier for rectifying said transmitted and modulated signal; and
    a capacitor for generating a power voltage by smoothing said rectified signal.

6. An apparatus for recording and reproducing video and audio information signals to and from magnetic tape, comprising:
    a rotatable rotating assembly;
    a fixed assembly;
    a pair of standard recording and reproducing heads mounted on said rotating assembly for recording and reproducing a video information signal to and from said magnetic tape;

a pair of long-play recording and reproducing heads mounted on said rotating assembly for alternatively recording and reproducing said video information signal to and from said magnetic tape;

a pair of audio recording and reproducing heads mounted on said rotating assembly for recording and reproducing the audio information signal to and from said magnetic tape;

an erasing head mounted on said rotating assembly for erasing the video information signal and the audio information signal recorded on said magnetic tape;

first, second and third transformers wherein respective primary windings are mounted on said rotating assembly and respective secondary windings are mounted on said fixed assembly;

a control signal generator mounted on said rotating assembly and connected to the primary winding of said third rotary transformer for generating switching control signals;

a first signal processor mounted on said rotating assembly and connected between said two pairs of recording and reproducing heads and the primary winding of said first rotary transformer for selecting a corresponding recording and reproducing head among said two pairs of recording and reproducing heads and processing information signal in response to said switching control signals;

a second signal processor connected between said pair of audio recording and reproducing heads and the primary winding of said second rotary transformer for processing the audio information signal in response to said switching control signals;

a switching circuit connected between said erasing head and the primary winding of said third rotary transformer being switching-controlled in response to said switching control signals;

a video processor connected the secondary winding of said first rotary transformer for processing said video information signal;

an audio processor connected to the secondary winding of said second rotary transformer for processing the audio information signal;

a modulation signal generator connected to the secondary winding of said third rotary transformer for modulating the erasing signal with the control signal and supplying the modulated signal to the secondary winding of said third rotary transformer; and a power supply mounted on said rotating assembly and connected to primary winding of said third rotary transformer for supplying operating power voltage to said control signal generator, said first signal processor and said second signal processor.

7. The recording and reproducing apparatus as claimed in claim 6, wherein said first signal processor comprises:

a plurality of amplifiers for amplifying a reproduced said video information signal picked up from the respective heads;

a plurality of head switching circuits for selecting said respective pair of heads;

a comparator for comparing the outputs of said head switching circuits;

a first switching element for selecting recording select switching control signal and output signals of said comparator in response to said switching control signal;

a second switching element for selecting said plural head switching circuit in response to the output signal of said first switching element;

a third switching element for switching the modulated signal transmitted to the primary winding of said third rotary transformer in response to an output signal of said first switching element;

a fourth switching element for selecting the output signals of said third switching element and said second signal processor and connecting the selected signal to the primary winding of said second rotary transformer in response to said switching control signals; and a plurality of recording amplifiers for amplifying said video information signal transmitted to the primary winding of said first rotary transformer and supplied to said respective heads in response to said switching control signals.

8. The recording and reproducing apparatus as claimed in claim 7, wherein said video processor comprises:

a reproducing processing unit connected to the secondary winding of said first rotary transformer for processing and generating the reproduced video signal and controlling phase of a color signal in response to a color phase control signal;

a recording processing unit receiving a video signal for generating a recording video signal to be supplied to the secondary winding of said first rotary transformer; and a color phase control signal generator enabled in response to a screen detecting control signal for generating said color phase control signal by receiving the signal transmitted to the secondary winding of said second rotary transformer and logically synthesizing with the head switching pulse signal and a standard/long-play select control signal.

9. The recording and reproducing apparatus as claimed in claim 8, wherein said color phase control signal generator comprises:

an envelope detector for detecting an envelope by receiving signal transmitted to the secondary winding of said second rotary transformer;

a wave shaper for wave-shaping the output signal of said envelope detector; and a logic synthesis circuit for generating said color phase control signal by logically synthesizing said wave-shaped signal with said head switching pulse signal and said standard/long-play select control signal.

10. An apparatus for recording and reproducing an information signal to and from magnetic tape and having a recording and reproducing processor for processing a video signal, comprising:

a rotatable rotating assembly including:
M recording and reproducing heads for recording and reproducing the information signal with respect to said magnetic tape, where M is an integer greater than 2;
a first primary winding of a first transformer;
a second primary winding of a second transformer;
a control signal generator for generating switching control signals in response to an output of said second primary winding;

a first signal processor connecting said M recording and reproducing heads and the primary winding of said first transformer for reproducing an information signal in response to said switching control signals;

a power supply connected to the primary winding of said second transformer for supplying operating power voltage and control information to said control signal generator; and a fixed assembly including:

a first secondary winding of said first transformer operatively connected to said recording and reproducing processor;

a second secondary winding of said second transformer;

a modulation signal generator connected to the secondary winding of said second transformer for modulating an erasing signal with a control signal to produce a modulated signal supplied to the secondary winding of said second transformer.

11. The recording and reproducing apparatus as claimed in claim 10, wherein said first signal processor includes a plurality of amplifiers for amplifying the reproduced information signal.

12. The recording and reproducing apparatus as claimed in claim 10, wherein said modulation signal generator comprises:

an oscillator for generating a predetermined first frequency signal as an erasing signal;

a first frequency-divider producing a second frequency signal from said first frequency signal;

second frequency-divider producing a third frequency signal from said first frequency signal;

a selector for selecting one of said second frequency signal and said third frequency signal in response to a timing signal; and a mixer for modulating said first frequency signal with an output signal from said selector and supplying said modulated signal to the secondary winding of said second transformer.

13. The recording and reproducing apparatus as claimed in claim 10, wherein said control signal generator comprises:

a first filter and a second filter for filtering respective components of said second frequency signal and said third frequency signal from said modulated signal received from said second transformer;

a comparator for comparing the detected signals of said first filter and said second filter and demodulating said control signal; and decoder for decoding said demodulated control signal and generating said switching control signals.

14. The recording and reproducing apparatus as claimed in claim 10, wherein said power supply comprises:

a rectifier receiving said modulated signal and producing a rectified signal; and a capacitor for generating a power voltage by smoothing said rectified signal.

15. The recording and reproducing apparatus as claimed in claim 10, wherein said rotating assembly comprises:

an erasing head for erasing the information signal recorded on said magnetic tape; and a switching circuit connecting said erasing head and said primary winding of said second transformer, said switching circuit being switch-controlled in response to said switching control signals.

* * * * *